(12) United States Patent
Hatala

(10) Patent No.: US 8,638,774 B2
(45) Date of Patent: Jan. 28, 2014

(54) CONTROLLING TIMING OF SYNCHRONIZATION UPDATES

(75) Inventor: Edward Hatala, Devizes (GB)

(73) Assignee: Ubiquisys Limited, Swindon (GB)

( * ) Notice: Subject to any disclaimer, the term of this patent is extended or adjusted under 35 U.S.C. 154(b) by 579 days.

(21) Appl. No.: 11/895,620

(22) Filed: Aug. 24, 2007

(65) Prior Publication Data

US 2008/0316996 A1 Dec. 25, 2008

(30) Foreign Application Priority Data

Jun. 22, 2007 (GB) .................................. 0712253.4

(51) Int. Cl.
*H04W 4/00* (2009.01)
*H04J 3/06* (2006.01)
*H04B 7/00* (2006.01)
*H04B 1/38* (2006.01)

(52) U.S. Cl.
USPC ........... 370/350; 370/328; 370/329; 370/349; 455/405; 375/130; 375/133; 375/219; 342/457; 342/357.24

(58) Field of Classification Search
USPC .......... 370/228–503; 455/434, 464, 422, 502, 455/509, 513
See application file for complete search history.

(56) References Cited

U.S. PATENT DOCUMENTS

| | | | | |
|---|---|---|---|---|
| 4,763,129 A * | 8/1988 | Perrotta | ......................... | 342/356 |
| 5,029,183 A * | 7/1991 | Tymes | ........................... | 375/141 |
| 5,420,592 A * | 5/1995 | Johnson | .................... | 342/357.46 |
| 5,479,441 A * | 12/1995 | Tymes et al. | .................. | 375/130 |
| 5,528,621 A * | 6/1996 | Heiman et al. | ................. | 375/133 |
| 5,592,480 A * | 1/1997 | Carney et al. | ................. | 370/347 |
| 5,912,644 A * | 6/1999 | Wang | ............................. | 342/457 |
| 5,995,515 A * | 11/1999 | Suzuki | ......................... | 370/465 |
| 6,308,077 B1* | 10/2001 | Walsh | ........................... | 455/503 |
| 6,363,101 B1* | 3/2002 | Sudo et al. | .................... | 375/147 |
| 6,542,727 B1* | 4/2003 | Kikuchi | .................... | 455/343.1 |
| 6,542,754 B1* | 4/2003 | Sayers et al. | .................. | 455/502 |
| 6,574,266 B1* | 6/2003 | Haartsen | ....................... | 375/133 |
| 6,665,541 B1* | 12/2003 | Krasner et al. | ............... | 455/502 |
| 6,795,424 B1* | 9/2004 | Kapoor et al. | ................ | 370/343 |

(Continued)

FOREIGN PATENT DOCUMENTS

| | | |
|---|---|---|
| EP | 1458098 | 9/2004 |
| GB | 2132042 | 6/1984 |

(Continued)

OTHER PUBLICATIONS

United Kingdom Search Report dated Oct. 20, 2007, for related GB Application No. 0712253.4 2 pages.

(Continued)

*Primary Examiner* — Ayaz Sheikh
*Assistant Examiner* — Venkatesh Haliyur
(74) *Attorney, Agent, or Firm* — Weaver Austin Villeneuve & Sampson LLP

(57) ABSTRACT

A base station for use in a mobile communications network includes a frequency synthesizer for generating signals at desired frequencies and a packet data interface for transmitting and receiving packet data signals over a wide area network. The basestation is configured to determine an elapsed time since it last synchronized the frequency synthesizer to a master device. The basestation is also configured to request synchronization packet data signals from the master device when the elapsed time exceeds a predetermined holdover period.

20 Claims, 3 Drawing Sheets

(56) References Cited

U.S. PATENT DOCUMENTS

| | | | |
|---|---|---|---|
| 6,850,740 B1* | 2/2005 | Haartsen | 455/101 |
| 6,904,279 B1* | 6/2005 | Lilja et al. | 455/426.2 |
| 6,937,872 B2* | 8/2005 | Krasner | 455/502 |
| 6,975,877 B1* | 12/2005 | Dergun et al. | 455/502 |
| 7,035,309 B2* | 4/2006 | Sudo et al. | 375/130 |
| 7,092,440 B1* | 8/2006 | Dress et al. | 375/140 |
| 7,103,460 B1* | 9/2006 | Breed | 701/32.9 |
| 7,228,118 B2* | 6/2007 | Stevenson | 455/259 |
| 7,269,203 B2* | 9/2007 | Sudo et al. | 375/147 |
| 7,295,077 B2* | 11/2007 | Thomsen et al. | 331/10 |
| 7,369,004 B2* | 5/2008 | Partridge et al. | 331/156 |
| 7,386,069 B2* | 6/2008 | Yang et al. | 375/343 |
| 7,400,667 B2* | 7/2008 | Sudo et al. | 375/147 |
| 7,421,321 B2* | 9/2008 | Breed et al. | 701/33.6 |
| 7,446,619 B2* | 11/2008 | Partridge et al. | 331/156 |
| 7,446,620 B2* | 11/2008 | Partridge et al. | 331/156 |
| 7,616,069 B2* | 11/2009 | Li | 331/25 |
| 7,626,966 B1* | 12/2009 | Ruiter et al. | 370/337 |
| 7,711,338 B2* | 5/2010 | Ansorge et al. | 455/255 |
| 7,787,886 B2* | 8/2010 | Markhovsky et al. | 455/456.1 |
| 7,822,424 B2* | 10/2010 | Markhovsky et al. | 455/456.1 |
| 7,877,104 B2* | 1/2011 | Turetzky et al. | 455/502 |
| 7,936,271 B2* | 5/2011 | Karr et al. | 340/572.4 |
| 2002/0054622 A1* | 5/2002 | Sudo et al. | 375/147 |
| 2004/0213367 A1* | 10/2004 | Han | 375/354 |
| 2005/0020279 A1* | 1/2005 | Markhovsky et al. | 455/456.1 |
| 2005/0147154 A1* | 7/2005 | Sudo et al. | 375/130 |
| 2005/0192727 A1* | 9/2005 | Shostak et al. | 701/37 |
| 2005/0195917 A1* | 9/2005 | Staszewski et al. | 375/295 |
| 2005/0273218 A1* | 12/2005 | Breed et al. | 701/2 |
| 2006/0012476 A1* | 1/2006 | Markhovsky et al. | 340/539.32 |
| 2007/0242632 A1* | 10/2007 | Sudo et al. | 370/311 |
| 2008/0068103 A1* | 3/2008 | Cutler | 331/74 |
| 2008/0136533 A1* | 6/2008 | Li | 331/16 |
| 2008/0316994 A1* | 12/2008 | Keevill et al. | 370/343 |
| 2008/0316996 A1* | 12/2008 | Hatala | 370/350 |
| 2009/0201152 A1* | 8/2009 | Karr et al. | 340/545.6 |

FOREIGN PATENT DOCUMENTS

| | | | |
|---|---|---|---|
| GB | 2335554 | | 9/1999 |
| GB | 2360404 | | 9/2001 |
| GB | 2391428 | | 2/2004 |
| GB | 2412037 | | 9/2005 |
| GB | 2441372 A | * | 3/2008 |
| WO | WO02098024 | * | 12/2002 |
| WO | WO2007/098690 A1 | | 9/2007 |
| WO | WO2007/144690 | | 12/2007 |

OTHER PUBLICATIONS

UK Intellectual Property Office Search Report dated Dec. 6, 2010 issued inGB0712253.4.

* cited by examiner

CONTROLLING TIMING OF SYNCHRONIZATION UPDATES

BACKGROUND OF THE INVENTION

This invention relates to a mobile communications network, and in particular to a system for maintaining frequency synchronization between the basestations of such a network. More generally, the invention relates to controlling the timing of synchronization updates between network nodes.

In a mobile communications network, including multiple basestations, where a mobile communications device may need to be able to establish wireless communications with any of those basestations depending on its location, it is necessary for the basestations to maintain frequency synchronization. That is, when a particular frequency is allocated for transmissions to or from a basestation, it needs to be able to ensure that it is able to receive or transmit on the allocated frequency, with a very high degree of accuracy.

In a conventional mobile communications network, each of the basestations is provided with a highly accurate crystal oscillator, which is able to maintain the required degree of frequency synchronization.

However, in the case of so-called femtocell basestations, which are intended to be located within a customer's home or small office premises and to provide mobile communications services to a relatively small number of mobile communications devices, such highly accurate crystal oscillators are prohibitively expensive.

The IEEE1588 specification describes a technique for achieving synchronization between nodes of a packet network, for example a network using the internet protocol (IP), to provide time synchronization of a slave at the receiver. This protocol, and other similar protocols, make use of time stamping an accurate clock at the source and transmitting this information, in a packet, to the slave at the receiver. If such packets are sent with short time intervals between them, they can maintain the precision of the receiver clock, but this requires large amounts of data to be sent over the packet data network. If such packets are sent with long time intervals between them, the desired precision of the receiver clock may not be maintained. The IEEE1588 specification therefore states that the time interval between sending synchronisation packets is a compromise between the stability and precision of the local clocks and the communication and computation load imposed by transmission of these messages.

SUMMARY OF THE INVENTION

According to a first aspect of the present invention, there is provided a basestation, for use in a mobile communications network, the basestation comprising:
  a frequency synthesizer, for generating signals at desired frequencies;
  a packet data interface, for transmitting and receiving packet data signals over a wide area network,
  wherein the basestation is adapted to determine an elapsed time since it last synchronized the frequency synthesizer to a master device; and
  wherein the basestation is adapted to request synchronization packet data signals from the master device when the elapsed time exceeds a predetermined hold-over period.

According to a second aspect of the present invention, there is provided a method of synchronizing a network node, the method comprising, in a synchronization slave node:
  determining that further synchronization is required;
  sending a request to a synchronization master node for synchronization packets; and
  using the requested synchronization packets to achieve frequency synchronization in the synchronization slave node.

According to a third aspect of the present invention, there is provided a method of synchronizing a crystal oscillator, the method comprising, at first time intervals:
  in operation, receiving synchronization data from a synchronization master;
  measuring a time elapsed since the crystal oscillator was last synchronized;
  measuring a temperature of the crystal oscillator;
  calculating and storing a frequency offset of the crystal oscillator.

For a better understanding of the present invention, and to show how it may be put into effect, reference will now be made, by way of example, to the accompanying drawings, in which:

DETAILED DESCRIPTION OF THE DRAWINGS

Figure 1:
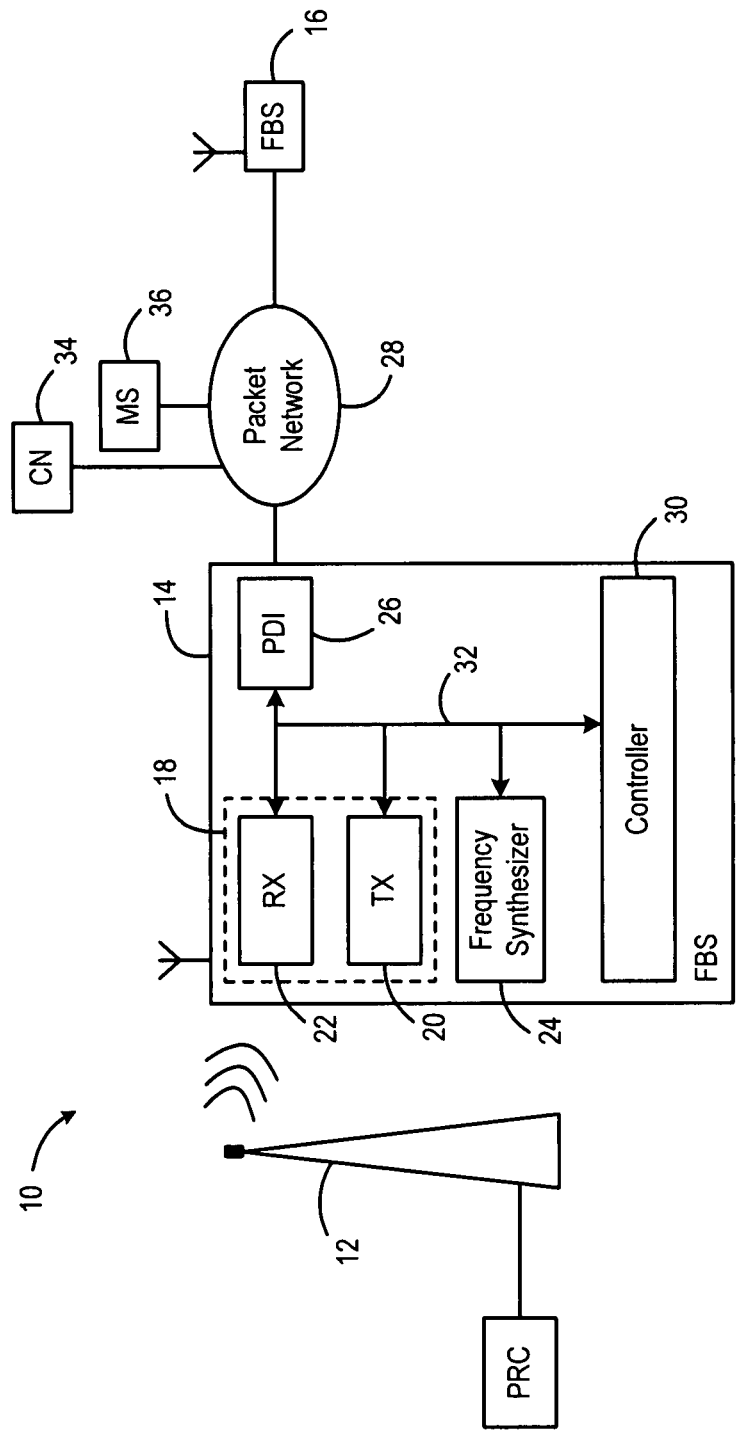
FIG. 1 shows a part of a mobile communications network in accordance with an aspect of the present invention.

FIG. 1 is a schematic diagram, illustrating a part of a mobile communication network 10. Aspects of the invention are applicable to networks of different types, but the invention is described herein with reference to its use in a cellular mobile communications network, in which mobile communications devices are able to communicate by means of a network of basestations.

The network 10 includes a relatively large number of basestations, such as the basestation 12, which, together, are intended to provide coverage to most or all of a relatively large geographical area. The area served by each of these basestations is typically referred to as a cell. In a typical network, the network operator may provide basestations that together serve the whole of the relatively large geographical area, with the cells served by these basestations being referred to as macrocells. The network operator may also provide additional basestations that serve particular small parts of that relatively large geographical area where network traffic levels are expected to be particularly high, such as in city centres, with the cells served by these basestations being referred to as microcells. Each of these basestations has a connection into the core network of the mobile communications network, provided by the mobile network operator.

Any subscriber of the network 10 is then able to move around within the area served by these basestations, with the associated mobile communications device being able to establish a connection with the appropriate one of the basestations, and the network being able to handover this connection from one basestation to another as the mobile communications device continues to move.

In addition, femtocell basestations are proposed, which allow a customer of the mobile communications network to set up a basestation of the mobile communications network within his own premises, such as a home or a small office. The femtocell basestation operates using the same communication frequencies as the other basestations of the network, allowing the same mobile communications devices to establish connections with them. The femtocell basestation uses the customer's existing broadband internet connection to establish a connection to the mobile network operator's core network, thereby reducing the need for the mobile network operator to build this part of the infrastructure required to increase network capacity. Each femtocell basestation may be set up so that it can provide a service only to previously registered mobile communications devices, for example devices owned by the same customer of the mobile communications network.

In the network 10, shown in FIG. 1, there are two such femtocell basestations (FBS) 14, 16.

The femtocell basestation 14 is shown in detail in FIG. 1, but it will be understood that the femtocell basestation 16 is generally similar.

The femtocell basestation 14 includes a wireless communications interface 18, for transmitting and receiving signals in the mobile communications network. As shown in FIG. 1, the wireless communications interface 18 includes transmit circuitry (TX) 20 for transmitting signals to registered mobile communications devices within the coverage area of the femtocell basestation 14, and receive circuitry (RX) 22 for receiving signals from the registered mobile communications devices within the coverage area.

Each of the transmit circuitry (TX) 20 and receive circuitry (RX) 22 must be able to operate at a desired frequency, to a high degree of accuracy, in order that transmissions can be successfully received. In normal operation of the basestation 18, the transmit circuitry (TX) 20 operates at one of the available system downlink frequencies, while the receive circuitry (RX) 22 operates at one of the available system uplink frequencies.

As shown in FIG. 1, each of the transmit circuitry (TX) 20 and receive circuitry (RX) 22 receives signals from a frequency synthesizer 24, which generates signals at desired frequencies. The frequency synthesizer 24 may for example contain a crystal oscillator, the frequency of oscillation of which can be used in a conventional way to generate the desired frequencies.

As also shown in FIG. 1, the femtocell basestation 14 includes a packet data interface (PDI) 26, for transmitting and receiving packet data signals over a wide area packet data network 28. In the embodiment shown in FIG. 1, the packet data interface (PDI) 26 is able to transmit and receive packet data signals over the internet.

As also shown in FIG. 1, the femtocell basestation 14 includes a controller 30, with the controller 30, wireless communications interface 18, the frequency synthesizer 24 and the packet data interface (PDI) 26 being able to communicate with each other as required, for example by means of an internal communications bus 32.

As discussed above, the femtocell basestations 14, 16 are able to send traffic to and receive traffic from a core network (CN) 34 of the mobile communications network 10 over the internet by means of their respective packet data interfaces 26. The mobile communications network 10 also contains a management system 36, which is also able to communicate with each of the femtocell basestations 14, 16 over the internet by means of their respective packet data interfaces 26. In this way, the management system 36 is able to monitor and/or control various aspects of the operation of the femtocell basestations 14, 16.

As mentioned above, one important aspect of the operation of a basestation concerns the frequency synchronization within the wireless network. The available communications bandwidth is divided into relatively narrow frequency channels, which means that, when a particular frequency channel is allocated for transmissions between a basestation and a mobile communications device, the transmissions must take place at a frequency that is extremely close to the allocated frequency, in order that the receiving device can correctly receive and decode the transmitted signal, and in order that the transmissions do not interfere with other signals being transmitted by other devices.

As shown in FIG. 1, the macrocell basestation 12 has access to a primary rate clock (PRC) 38, which may for example take the form of a highly accurate frequency synthesizer, for example containing a crystal oscillator whose accuracy can be maintained over long time periods and in a wide range of operating conditions. For example, the PRC 38 may contain a crystal oscillator whose frequency of operation is compensated for any changes in operating temperature, and whose operating temperature is controlled such that such changes are in any event minimized.

However, such crystal oscillators are expensive, and the frequency synthesizer 24 in the femtocell basestation 14, as well as the corresponding frequency synthesizer in the femtocell basestation 16, typically contain much less accurate crystal oscillators.

Figure 2:
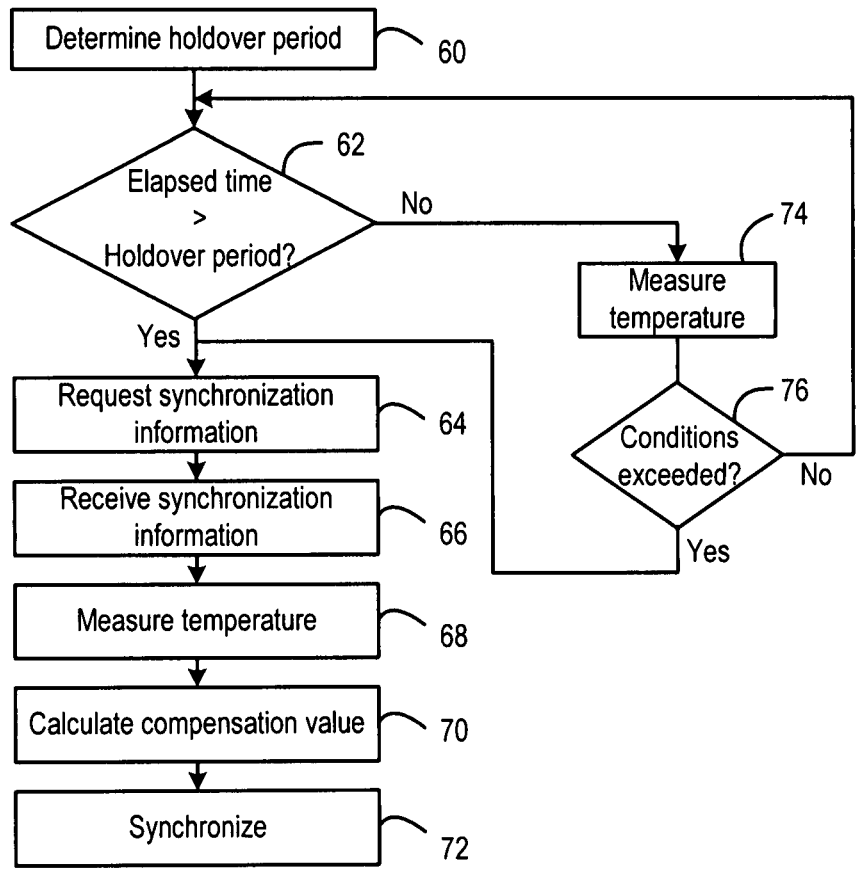
FIG. 2 is a flow chart, illustrating a first method in accordance with the invention.

FIG. 2 is a flow chart, illustrating a method of achieving frequency synchronization between the femtocell basestations 14, 16 of the mobile communications network 10.

Specifically, the macrocell basestation 12 transmits radio synchronization information. This radio synchronization information is conventional, and is generally provided such that mobile communications devices within the coverage area of the macrocell basestation 12 are able to detect the information and achieve frequency synchronization with their serving macrocell basestation. The femtocell basestations of the network, such as the femtocell basestations 14, 16, switch their operations such that they are able to detect signals transmitted on the system downlink frequencies, such as the frequency on which the radio synchronization information is transmitted by the macrocell basestation 12. In one embodiment of the invention, the receive circuitry (RX) 22 is able to switch such that, instead of operating at one of the available system uplink frequencies for detecting signals from mobile communications devices, it is able instead to detect signals at one of the available system downlink frequencies. This switch of operation is then controlled such that it takes place at a time when it does not interrupt normal operation of the femtocell basestation. In another embodiment, the femtocell basestation includes separate receive circuitry for detecting the radio synchronization information.

In this illustrative example, the femtocell basestation 14 is one of the femtocell basestations in the network that is able to detect the radio synchronization information transmitted by the macrocell basestation 12, while the femtocell basestation 16 is one of the femtocell basestations in the network that is unable to detect radio synchronization information transmitted by any macrocell basestation.

The femtocell basestation 14 therefore synchronizes its operations based on the received radio synchronization information. For example, it may apply a (further) correction to the signals generated by its frequency synthesizer 24, in order that the frequencies of such signals correspond with the intended frequencies, to the required high degree of accuracy. This process is the same as that used conventionally by a mobile communications device to achieve synchronization with its serving basestation.

Also, the management system 36 informs the femtocell basestations 14, 16 that they are to have a master-slave relationship for propagating synchronization information. That is, the femtocell basestation 14 is to be the synchronization master, while the femtocell basestation 16 is to be the synchronization slave.

FIG. 2 illustrates the process performed in the femtocell basestation 16 in order to achieve frequency synchronization. In the illustrated process, this is achieved by defining a means to reduce as far as possible the network traffic loading imposed by the transmission of the synchronisation messages.

Thus, in step 60 of the process, the femtocell basestation 16 defines a hold-over period. This is the period between a time when a crystal oscillator is synchronized and a time when it goes out of a given synchronization tolerance, or frequency offset. For example, if the end user equipment requirement is that the crystal oscillator should not drift out of frequency specification by more than +/−0.1 ppm, and if it is known that the result of crystal aging is a frequency change of 1 ppm per year, then, although the crystal ageing may not be linear, the effect of crystal ageing on the frequency offset can be approximated to a rate of 0.1 ppm per month. In this case, the hold-over period can be defined to be approximately one calendar month, although it is relatively unimportant for these purposes whether it is defined as one calendar month, 28 days or 700 hours, for example.

Further, the hold-over period can be determined by the femtocell basestation 16 itself, or can be pre-stored in the femtocell basestation 16 during manufacture, or can be determined based on information transmitted from the management system 36.

The femtocell basestation 16 has time of day information available (including day, month, year), and from this it can set up a synchronization schedule. In step 62, it is determined whether the time that has elapsed since the crystal oscillator was last synchronized exceeds this hold-over period. This step is performed repeatedly until it is determined that the elapsed time has exceeded the hold-over period.

At some time thereafter, either immediately or at some convenient time, in step 64 the femtocell basestation 16 sends a message to its assigned synchronization master, that is, the femtocell basestation 14. This message requests that the synchronization master starts sending synchronization messages, containing synchronization information, and this information is received in step 66. It will be noted that, although, in this embodiment of the invention, the synchronization master is another femtocell basestation of the wireless communication, it is also possible to provide one or more dedicated time server nodes that have no basestation capability. In that case, the femtocell basestation 16 can again request synchronization from the synchronization master when the time that has elapsed since the crystal oscillator was last synchronized exceeds the hold-over period.

In aspects of the invention, the synchronization information can be in any convenient form, for example in the form of packets of data, each of which contains a timestamp indicating its time of transmission, as measured by the synchronization master. The synchronization slave can then examine the times of receipt of these packets of data, as measured by its own clock, which is derived from its frequency synthesizer. The differences between the times of transmission of two data packets, as measured by the synchronization master, can then be compared with the times of receipt of these packets of data, as measured by the synchronization slave, in order to give measure of the frequency synchronization between the synchronization master and the synchronization slave. The accuracy of the synchronization can be increased by taking a large number of such measurements.

The message sent in step 64 from the synchronization slave femtocell basestation 16 to the synchronization master femtocell basestation 14 may request that the synchronization master sends a specified number of packets of synchronization data, or may request that the synchronization master starts sending packets of synchronization data, in which case a subsequent message must be sent to request that the synchronization master stops sending packets of synchronization data.

As described, no synchronization messages are sent except when specifically requested by the slave femtocell basestation 16. However, in an alternative arrangement, the synchronization master femtocell basestation 14 may be sending packets of synchronization data at a low rate at all times, in which case the message sent in step 64 from the synchronization slave femtocell basestation 16 to the synchronization master femtocell basestation 14 may request that the synchronization master increase the rate at which packets of synchronization data are sent.

In step 68, the femtocell basestation measures the ambient temperature or, preferably, the temperature in the vicinity of its crystal oscillator. The performance of a crystal oscillator depends on its temperature, and this information will be used in maintaining synchronization of the device, as described below.

In step 70, the femtocell basestation calculates a compensation value to be applied to the crystal oscillator. As will be known, this requires a comparison between the frequency generated by the crystal oscillator (which can be deduced from the time measurements described above) and its nominal frequency. The difference between these frequencies indicates the value of a voltage that must be applied to the crystal oscillator, in order to bring the frequency back to the nominal frequency.

In step 72, this voltage is applied to the crystal oscillator, in order to bring it into synchronization with the synchronization master.

Thus, the number of synchronization packets required to be transmitted over the network is greatly reduced, by transmitting no such packets (or only a small number of packets) during the hold over period. Rather, only bursts of synchronization packets are required to synchronize the slave oscillator, separated by relatively long hold-over periods. For example, if a slave device is able to achieve synchronization in 1000 seconds and the hold-over period is 30 days, or 2.5 million seconds, this means that synchronization packets are only sent for 1/2500 of the time, and the number of packets sent is reduced by a factor of 2500, compared with a situation in which packets are being sent continually.

The method described herein also takes account of changes in the temperature at the slave crystal oscillator, by characterizing the frequency error offset against this temperature. The crystal oscillator at the slave device is typically a Voltage Controlled Temperature Compensated Crystal Oscillator (VCTXCO), that is, a crystal oscillator including correction circuitry that makes use of a previously characterized frequency offset against temperature, in order to be able to apply a further correction, based on a measured temperature of the device.

It should also be noted that, even if the hold-over period has not been exceeded, synchronization messages can be initiated if the temperature conditions exceed preset limits. Thus, if it is determined at step 62 that the hold-over period has not been exceeded, the process passes to step 74, in which the temperature of the device is measured. Then, in step 76, it is determined whether the temperature conditions exceed the preset limits. In the simplest case, the preset limit may be a threshold temperature, which is set to a value that differs by a certain temperature difference from a temperature at which the properties of the device are known reliably. In other cases, the temperature conditions may include a threshold value for the rate of change of the temperature, or may include one or more different combinations of temperature value and rate of change of temperature.

If it determined in step 76 that the temperature conditions are met, such that there is doubt as to whether the device will have remained in synchronization, then the process passes to step 64, in which synchronization information is requested. (It may then be unnecessary to repeat the temperature measurement of step 68.) If the temperature conditions are not met, that is, there is no reason to think that the device will not have remained in synchronization, the process returns to step 62.

As mentioned above, the VCTXCO correction circuitry makes use of a previously characterized frequency offset against temperature, in order to be able to apply a further correction, based on a measured temperature of the device. However, the frequency error is also time dependent. Therefore, in accordance with an aspect of the invention, the VCTXCO calculates an ageing factor before applying temperature compensation.

Figure 3:
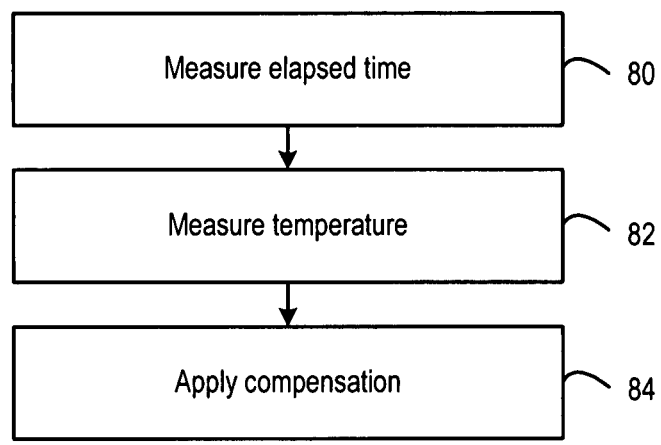
FIG. 3 is a flow chart, illustrating a second method in accordance with the invention.

Thus, as shown in FIG. 3, during operation of the device, in step 80, the synchronization slave femtocell basestation 16 measures the time elapsed since the since the crystal oscillator was last synchronized.

Then, in step 82, it measures the temperature of, or in the vicinity of the crystal oscillator.

Based on these measurements, in step 84, a compensation value is applied to the crystal oscillator, in order to maintain its output frequency as close as possible to the intended frequency, in order to maintain synchronization with the synchronization master device 14.

Thus, in a conventional device, a temperature is measured, and a compensation value is applied that takes account of the predicted or empirically calculation value that is required for that measured temperature.

However, in accordance with the present invention, as described with reference to FIG. 2, the actual frequency errors for a number of different temperatures have been calculated. Thus, when calculating and applying the compensation value in step 84 of the process shown in FIG. 3, it is possible to use the previously calculated compensation values. For example, the current compensation value can be calculated from a previously calculated compensation value that was obtained at the current ambient temperature, albeit taking account of the effects of ageing.

In order to improve the accuracy of this process, it is possible to request synchronization data packets even at times when it is not intended to synchronize the device, that is, during the hold-over period, and to calculate the frequency offsets at such times, for a variety of ambient temperatures.

For example, if it is determined that the hold-over period is 30 days, and the slave device is synchronized to the master device once in every 30 days, it is nevertheless possible to calculate the current frequency offset once every 3 days, at the then-current ambient temperature. When such calculations have been performed, and the results stored, over a period of time, it will be possible in step 84 of the process shown in FIG. 3 to refer to a previous frequency offset calculation, made on the basis of the same (or similar) ambient temperature and the same (or similar) elapsed time, in order to obtain a compensation value to be applied. This compensation value can of course be used in conjunction with a temperature compensation mechanism provided by the manufacturer of a TCXO, in order to produce a finer granularity of frequency compensation control.

The invention has been described above with reference to a mobile communications network. However, it is applicable to any packet networks that require a synchronization mechanism to incur the lowest bandwidth overhead possible. It can thus be used for any synchronization mechanism over any packet network for the synchronization of, for example, basestations, automation systems or PCs.

There is thus described a system which allows master slave synchronization connectivity, and thus in one implementation allows each femtocell basestation in a network to establish the required degree of frequency synchronization in a resilient way, without needing a highly specified crystal oscillator, and without requiring every femtocell basestation to be able to obtain its synchronization over the wireless interface. This therefore allows the required frequency synchronization to be established with reduced total expenditure.

The invention claimed is:

1. A basestation, for use in a mobile communications network, the basestation comprising:
    a frequency synthesizer, for generating signals at desired frequencies;
    a packet data interface, for transmitting and receiving packet data signals over a wide area network;
    wherein the basestation is configured to determine an elapsed time since it last synchronized the frequency synthesizer to a master device;
    wherein the basestation is configured to request synchronization packet data signals from the master device when the elapsed time exceeds a predetermined hold-over period;
    wherein, when the elapsed time does not exceed the predetermined hold-over period, the basestation is configured to determine whether temperature conditions at the basestation meet a predetermined temperature condition threshold, and to determine whether a resynchronization is required for the frequency synthesizer to remain in synchronization;
    wherein the basestation is configured to request synchronization packet data signals from the master device when said temperature condition threshold is met;
    wherein the basestation is configured to synchronize the frequency synthesizer to the master device on receipt of the synchronization packet data signals from the master device; and
    wherein the basestation is configured to request the master device to stop sending synchronization packet data signals to synchronize the frequency synthesizer to the master device.

2. The basestation as claimed in claim 1, wherein the basestation connects into a core network of the mobile communications network through the packet data interface.

3. The basestation as claimed in claim 1, wherein the master device comprises a second basestation in the mobile communications network, and wherein the second basestation connects into the core network of the mobile communications network through the packet data interface.

4. The basestation as claimed in claim 1, wherein the temperature conditions comprise a temperature difference from a specified temperature.

5. The basestation as claimed in claim 1, wherein the temperature conditions comprise a threshold value for the rate of change of temperature.

6. A method of synchronizing a crystal oscillator, the method comprising, at first time intervals:
receiving synchronization data from a synchronization master device;
the method further comprising, when synchronization data is received, measuring a time elapsed since the crystal oscillator was last synchronized;
calculating and storing a first frequency offset of the crystal oscillator, the first frequency offset comprising a difference between a frequency generated by the crystal oscillator and a frequency derived from the synchronization data, and the method further comprising:
measuring a temperature of the crystal oscillator;
determining a second frequency offset based on at least one previously stored frequency offset obtained at a similar elapsed time and measured temperature; and
upon receipt of the synchronization data from the synchronization master device, applying a compensation value to the crystal oscillator based on said determined second frequency offset to synchronize the crystal oscillator to the synchronization master device.

7. The method of synchronizing a crystal oscillator, as claimed in claim 6, comprising, at second time intervals:
receiving synchronization data from a synchronization master device;
measuring a temperature of the crystal oscillator;
calculating a frequency offset of the crystal oscillator; and
synchronizing the crystal oscillator based on the calculated frequency offset.

8. A method as claimed in claim 7, wherein the second time intervals exceed the first time intervals.

9. A method of synchronizing a basestation, the method comprising:
at the basestation, transmitting and receiving packet data signals over a wide area network;
generating signals at desired frequencies using a frequency synthesizer;
determining an elapsed time since the basestation last synchronized the frequency synthesizer to a master device;
when the elapsed time does not exceed a predetermined hold-over period, determining whether temperature conditions at the basestation meet a predetermined temperature condition threshold and determining whether a resynchronization is required for the frequency synthesizer to remain in synchronization;
requesting synchronization packet data signals from the master device when said temperature condition threshold is met;
requesting synchronization packet data signals from the master device when the elapsed time exceeds the predetermined hold-over period;
requesting a specified number of synchronization data packets from the master device;
synchronizing the frequency synthesizer to the master device on receipt of the synchronization packet data signals from the master device; and
requesting the master device to stop sending synchronization packet data signals to synchronize the frequency synthesizer to the master device.

10. The method as claimed in claim 9, wherein the step of requesting synchronization packet data signals from the master device comprises sending a request for a specified number of synchronization packet data signals.

11. The method as claimed in claim 9, wherein the basestation connects into a core network of the mobile communications network.

12. The method as claimed in claim 9, wherein the master device comprises a second basestation in the mobile communications network, and wherein the second basestation connects into the core network of the mobile communications network.

13. The method as claimed in any one of claims 9, 11 and 12, wherein the basestation is configured to synchronize the frequency synthesizer to the master device on receipt of the synchronization packet data signals from the master device.

14. The method as claimed in any one of claims 9, 11 and 12, wherein the master device comprises a second basestation of a mobile communications network.

15. The method as claimed in claim 13, wherein the basestation is configured to request the master device to stop sending synchronization packet data signals to synchronize the frequency synthesizer to the master device.

16. A basestation for use in a mobile communications network, the basestation comprising:
a frequency synthesizer, for generating signals at desired frequencies;
a packet data interface, for transmitting and receiving packet data signals over a wide area network,
wherein the basestation is configured to determine an elapsed time since it last synchronized the frequency synthesizer to a master device;
wherein the basestation is configured to request synchronization packet data signals from the master device when the elapsed time exceeds a predetermined hold-over period;
wherein, when the elapsed time does not exceed the predetermined hold-over period, the basestation is configured to determine whether temperature conditions at the basestation meet a predetermined temperature condition threshold and to determine whether a resynchronization is required for the frequency synthesizer to remain in synchronization;
wherein the basestation is configured to request synchronization packet data signals from the master device when said temperature condition threshold is met; and
wherein the basestation is configured to request a specified number of synchronization data packets from the master device.

17. The basestation as claimed in claim 16, wherein the basestation connects into a core network of the mobile communications network through the packet data interface.

18. The basestation as claimed in claim 16, wherein the master device comprises a second basestation in the mobile communications network, and wherein the second basestation connects into the core network of the mobile communications network through the packet data interface.

19. The basestation as claimed in claim 16, wherein the temperature conditions comprise a temperature difference from a specified temperature.

20. The basestation as claimed in claim 16, wherein the temperature conditions comprise a threshold value for the rate of change of temperature.

* * * * *